US012561058B2

(12) United States Patent
Samanta et al.

(10) Patent No.: US 12,561,058 B2
(45) Date of Patent: Feb. 24, 2026

(54) DYNAMIC MODIFICATION OF INPUT/OUTPUT REQUESTS FOR RAID DEVICES

(71) Applicant: Avago Technologies International Sales Pte. Limited, Singapore (SG)

(72) Inventors: Sumanesh Samanta, Colorado Springs, CO (US); Daryl Woodward, Colorado Springs, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 122 days.

(21) Appl. No.: 18/427,034

(22) Filed: Jan. 30, 2024

(65) Prior Publication Data

US 2025/0244872 A1     Jul. 31, 2025

(51) Int. Cl.
*G06F 3/06* (2006.01)

(52) U.S. Cl.
CPC ............ *G06F 3/061* (2013.01); *G06F 3/0653* (2013.01); *G06F 3/0689* (2013.01)

(58) Field of Classification Search
None
See application file for complete search history.

(56) References Cited

U.S. PATENT DOCUMENTS

2020/0133775 A1* 4/2020 Kang .................... G06F 3/0611
2023/0418518 A1* 12/2023 Hahn ...................... G06F 3/061

* cited by examiner

*Primary Examiner* — Scott C Sun
(74) *Attorney, Agent, or Firm* — Quarles & Brady LLP

(57) ABSTRACT

Novel tools and techniques are provided for implementing distribution of IO requests to a storage array. In various cases, a controller for a redundant array of independent disks can be configured determine a first drive configured to receive a first input/output (IO) request; detect a first number IO requests pending for the first drive; determine the first number of IO requests pending for the first drive exceeds a first predetermined threshold; and based on a determination the first number of IO requests pending for the first drive exceeds the first predetermined threshold, skip sending the first IO request to the first drive.

19 Claims, 7 Drawing Sheets

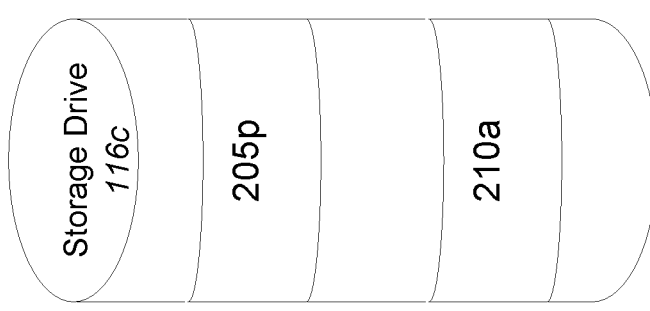
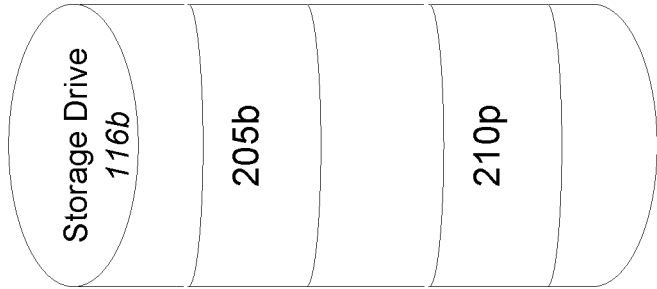
Fig. 2A
114

| Master IO Queue for Storage Array 114 |
| --- |
| IO Operation Number |
| IO Operation 01 |
| IO Operation 02 |
| IO Operation 03 |
| IO Operation 04 |
| IO Operation 05 |
| IO Operation 06 |
| IO Operation 07 |
| IO Operation 08 |
| IO Operation 09 |
| IO Operation 10 |
| IO Operation 11 |
| IO Operation 12 |
| IO Operation 13 |
| IO Operation 14 |
| IO Operation 15 |
| IO Operation 16 |
| IO Operation 17 |
| IO Operation 18 |
| IO Operation 19 |
| IO Operation 20 |
| IO Operation 21 |
| IO Operation 22 |
| IO Operation 23 |
| IO Operation 24 |
| IO Operation 25 |

| Pending Individual IO List for Drive 116a |
|---|
| IO Request 01A |
| IO Request 03A |
| IO Request 04A |
| IO Request 05B |
| IO Request 06B |
| IO Request 07A |
| IO Request 08A |
| IO Request 10A |
| IO Request 12A |
| IO Request 13B |
| IO Request 14A |
| IO Request 15A |

402a

| Pending Individual IO List for Drive 116b |
|---|
| IO Request 02B |
| IO Request 03B |
| IO Request 06A |
| IO Request 07B |
| IO Request 09B |

402b

| Pending Individual IO List for Drive 116c |
|---|
| IO Request 01B |
| IO Request 04B |
| IO Request 08B |
| IO Request 09A |
| IO Request 15B |

402c

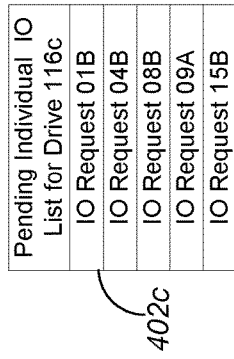
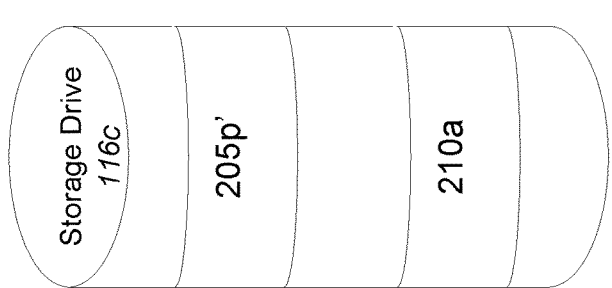
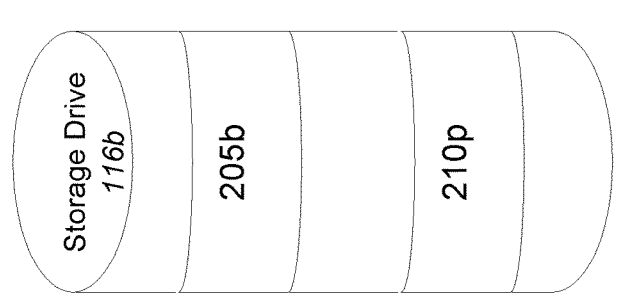
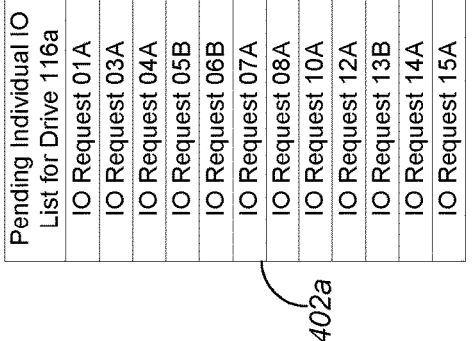
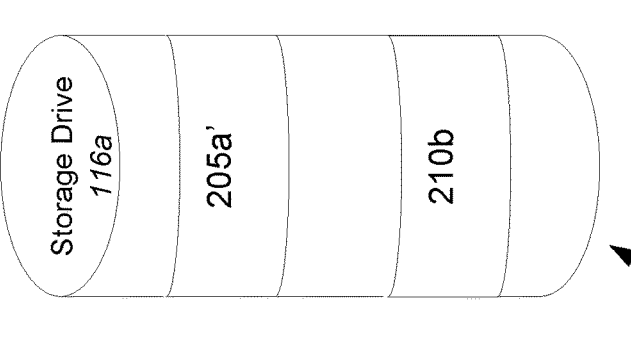

Storage Drive 116c
205p'
210a

Storage Drive 116b
205b
210p

Storage Drive 116a
205a'
210b

DYNAMIC MODIFICATION OF INPUT/OUTPUT REQUESTS FOR RAID DEVICES

COPYRIGHT STATEMENT

FIELD

The present disclosure relates, in general, to methods, systems, and apparatuses for implementing dynamic modification or distribution of one or more input/output requests for RAID devices.

BACKGROUND

Redundant array of independent disks (RAID) is a way of storing data in different places on multiple hard drives or solid-state drives in a storage array. There are different RAID levels (e.g., RAID 0-RAID 6). RAID 5 comprises at least three drives while RAID 6 comprises at least four drives. RAID 5 uses striping to divide a piece of data across at least two drives while parity information (e.g., information used to reconstruct or recalculate data stored on the at least two drives) is stored on another drive separate from the at least two drives. If one drive fails in RAID 5, missing data can be recalculated using the remaining two drives. RAID 6 uses striping to divide a piece of data across at least two drives while parity information is stored on at least two other drives. If one or two drives fail in RAID 6, missing data can be reconstructed using at least two of the remaining drives. In both RAID 5 and RAID 6 storage arrays, parity information can be stored and distributed among the drives in one or more units called "stripes" in the storage array and may not be stored on only one drive.

For RAID 5 and 6 storage arrays (and other RAID storage arrays), there is a chance of input/output (IO) requests not being evenly distributed among drives of the storage array. This uneven distribution of IO requests can occur (1) when at least one drive receives more IO requests than at least one other drive of the storage array; or (2) when at least one drive becomes slow or busy and takes more time to complete one or more IO requests.

Hence, there is a need for more robust and scalable solutions for implementing distribution of IO requests to one or more drives of a storage array. Thus, methods and systems are provided for implementing distribution of IO requests to one or more drives in a RAID 5 or RAID 6 storage array.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A and 2B are block diagrams of a portion of the storage array of FIG. 1, in accordance with various embodiments;

FIG. 3A is a diagram illustrating an exemplary master IO operation queue for a storage array, in accordance with various embodiments;

FIG. 4 is a block diagram of a portion of the storage array of FIG. 1 comprising pending IO lists for individual drives of the storage array, in accordance with various embodiments;

DETAILED DESCRIPTION OF EMBODIMENTS

Figure 1:
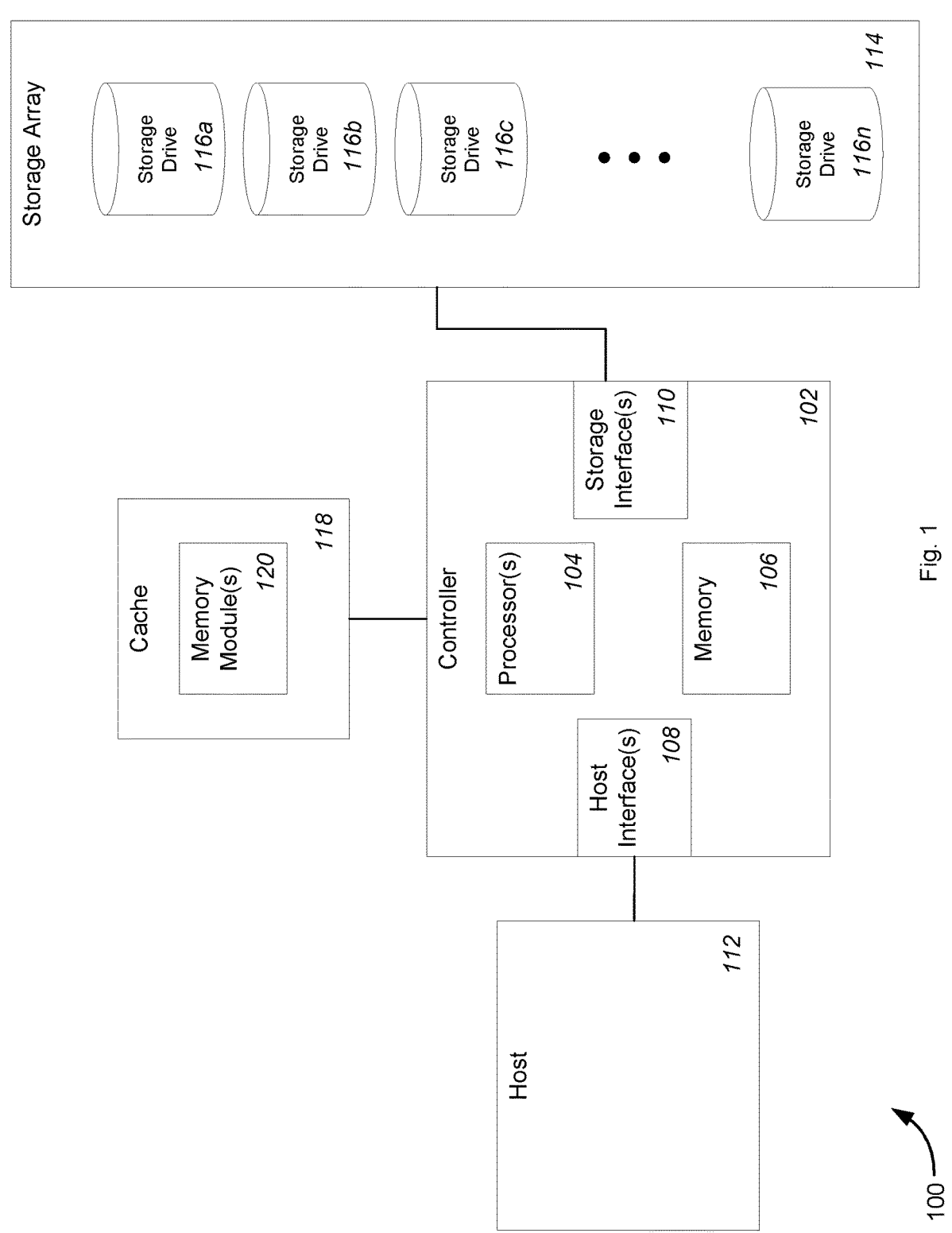
FIG. 1 is a block diagram of a system having a controller, host system, and storage array, in accordance with various embodiments.

Various embodiments provide tools and techniques for storage of data on one or more drives. More particularly, methods, systems, and apparatuses are provided for implementing storage of data on one or more drives in a RAID 5 or RAID 6 storage array.

In a first aspect, a controller for a redundant array of independent disks (RAID) comprises a processor and a memory comprising instructions. The instructions, when executed by the processor, cause the processor to determine a first drive configured to receive a first input/output (IO) request; detect a first number IO requests pending for the first drive; determine the first number of IO requests pending for the first drive exceeds a first predetermined threshold; based on a determination the first number of IO requests pending for the first drive exceeds the first predetermined threshold, skip sending the first IO request to the first drive; and after skipping the first IO request, process a next IO request.

In various cases, the instructions, when executed by the processor, further cause the processor to translate a first IO operation received from a first device into one or more IO requests including the first IO request. In some cases, the first IO operation includes an address to send the IO operation and translating the first IO operation received from the first device into the one or more IO requests including the first IO request comprises translating the address of the IO operation to one or more locations associated with one or more drives of a storage array. In some cases, the one or more locations include a first location on the first drive and determining the first drive configured to receive the first IO request comprises determining the first drive comprising the first location.

In some embodiments, detecting the first number of IO requests pending for the first drive comprises monitoring an IO request list associated with the first drive.

In various instances, determining the first number of IO requests pending for the first drive exceeds the first predetermined threshold comprises determining the first number of IO requests pending for the first drive of a storage array exceeds at least one of an average number or a median number of second IO requests pending for two or more second drives of the storage array.

In some cases, the first IO request is associated with a first IO operation received from a first device and the instructions, when executed by the processor, further cause the processor to sort a plurality of IO operations received from the first device including the first IO operation into a queue indicating an order to send the one or more IO operations to a storage array comprising the first drive. The plurality of IO operations in the queue can be sorted based on at least one of least recently used (LRU) data associated with a corresponding IO operation or an address associated with the corresponding IO operation. In various instances, skipping sending the first IO request to the first drive comprises sending the first IO operation to an end of the queue. In some cases, skipping sending the first IO request to the first drive comprises sending the first IO operation to the queue and resorting the plurality of IO operations in the queue based on an address associated with a corresponding IO operation.

In various embodiments, skipping sending the first IO request to the first drive comprises skipping a first node associated with the first drive.

In various instances, the instructions, when executed by the processor, further cause the processor to translate a first IO operation received from a first device into one or more IO requests for one or more drives including the first IO request for the first drive and a second IO request for the second drive. Based on a determination the first IO request was skipped, the instructions, when executed by the processor, further can cause the processor to skip sending the second IO request to the second drive.

In some cases, the instructions, when executed by the processor, further cause the processor to determine a second drive where a second IO request associated with the first IO request is to be sent; and based on a determination the first number of IO requests pending for the first drive exceeds the first predetermined threshold, skip sending the second IO request to the second drive. In some instances, the first IO request comprises at least one of a first request to read first data stored on the first drive or a second request to update the first data on the first drive and the second IO request comprises a third request to read parity information stored on the second drive or a fourth request to update the parity information on the second drive. In some instances, the instructions, when executed by the processor, further cause the processor to determine the second drive where a third IO request is to be sent; detect a second number of IO requests pending for the second drive; determine the second number of IO requests pending for the second drive does not exceed a second predetermined threshold; and based on a determination the second number of IO requests pending for the second drive does not exceed the second predetermined threshold, send the third IO request to the second drive.

In another aspect, a method for operating a controller of a redundant array of independent disks (RAID) includes determining a first drive where a first input/output (IO) operation is to be sent; detecting a first number of IO operations pending for the first drive; comparing the first number of IO operations pending for the first drive to a predetermined threshold; based on a comparison of the first number of IO operations pending for the first drive to the predetermined threshold, skipping sending the first IO operation to the first drive; and skipping sending the first IO operation to the first drive comprises skipping a first node associated with the first drive.

In some embodiments, skipping sending the first IO operation to the first drive comprises skipping a first node associated with the first drive.

In some cases, the method can further include adding a plurality of IO operations for a storage array comprising the first drive to a queue indicating an order to execute the plurality of IO operations. In various embodiments, skipping sending the first IO operation comprises at least one of adding the first IO operation to an end of the queue or sending the first IO operation to the queue and resorting the queue based on an address associated with a corresponding IO operation.

The method can further include determining two or more drives including the first drive where the IO operation is to be sent; and based on a comparison of the first number of IO operations pending for the first drive to the predetermined threshold, skipping sending the IO operation to the two or more drives including the first drive.

In yet another aspect, a storage system can include a cache configured to store data including first data and second data; a storage array comprising a first drive; and a controller configured to read or write at least a portion of the data from or to the storage array. The controller can further be configured to detect the first data stored in the cache; determine the first drive where the first data is to be stored; detect a number of input/output (IO) requests pending for the first drive; compare the number of IO requests pending for the first drive to a threshold criteria; based on a comparison of the number of IO requests to the threshold criteria, skip storing the first data on the first drive; and after skipping storing the first data, process the second data.

In some instances, comparing the first of IO requests pending for the first drive to the threshold criteria comprises determining the first number of IO requests pending for the first drive of a storage array exceeds at least one of an average number or a median number of second IO requests pending for two or more second drives of the storage array.

In the following description, for the purposes of explanation, numerous details are set forth to provide a thorough understanding of the described embodiments. It will be apparent to one skilled in the art, however, that other embodiments may be practiced without some of these details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the disclosure, as other embodiments of the disclosure may omit such features.

Similarly, when an element is referred to herein as being "connected" or "coupled" to another element (such as through electrical or communicative connection or coupling), it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Likewise, when an element is referred to herein as being an "electronic circuit" or simply "circuit", it is commonly recognized as a building block of modern electronics. Circuits are composed of various electronic components such as resistors, capacitors, inductors, diodes, transistors, and integrated circuits. In some cases, integrated circuits can be formed from one or more circuits. These electronic components are carefully selected and interconnected to create a circuit that can perform a specific task or carry out a particular function. Circuits can be as simple as a basic switch that turns a light on and off, or they can be incredibly complex, such as those found in advanced computer systems, communication devices, or medical equipment. Circuits can be categorized into different types based on their purpose or function, including amplifiers, oscillators, filters, power supplies, and logic gates, among others. Additionally, circuits can include software or firmware in addition to hardware or instead of hardware to carry out a particular function.

Additionally, various processors, controllers, units, circuits, modules, or other components may be described as "configured to" or "adapted to" perform a task or tasks. In such contexts, "configured to" or "adapted to" is a broad recitation of structure generally meaning "having circuitry that" performs the task or tasks during operation. As such, the processor/controller/unit/circuit/module/component can be configured to perform the task even when the processor/controller/unit/circuit/module/component is not currently on. In general, the circuitry that forms the structure corresponding to "configured to" or "adapted to" may include hardware circuits and/or memory storing program instructions executable to implement the operation. The memory can include volatile memory such as static or dynamic random-access memory and/or nonvolatile memory such as optical or magnetic disk storage, flash memory, programmable read-only memories, etc. Similarly, the processor/controller/unit/circuit/module/component may be described as performing a task or tasks, for convenience in the description. Such descriptions should be interpreted as including the phrase "configured to" or "adapted to." Reciting a processor/controller/unit/circuit/module/component that is configured to perform one or more tasks is expressly intended not to invoke 35 U.S.C. § 112, paragraph six interpretation for that processor/controller/unit/circuit/module/component.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Additionally, it should be understood that spatial descriptions (e.g., "above," "below," "up," "left," "right," "down," "top," "bottom," "middle," "vertical," "horizontal," etc.) used herein are for purposes of illustration only, and that practical implementations of the structures described herein can be spatially arranged in any orientation or manner. Further, descriptions such as "first," "second," "third," etc. used herein are for purposes of distinguishing different aspects of each embodiment, and such terms are not intended to denote any particular order or sequence unless expressly indicated otherwise.

In various RAID 5 and 6 storage arrays (and other RAID storage arrays), there is a chance of input/output (IO)

requests not being evenly distributed among drives of the storage array. This uneven distribution of IO requests can occur (1) when at least one drive of the storage array receives more IO requests than at least one other drive of the storage array; or (2) when at least one drive of the storage array becomes slow or busy and takes more time to complete one or more IO requests. When the IO requests are not evenly distributed among drives of the storage array, the entire storage array can become slower as discussed below with respect to FIGS. 1-5.

The proposed drive storage systems and methods seek to more evenly distribute IO requests among drives in a storage array. In order to more evenly distribute IO requests among drives of a storage array, a controller of the storage array can be configured to monitor IO requests for each individual drive of the storage array and skip sending a pending IO request to a drive that is slow or has a higher number of IO requests than other drives. Once the IO request is skipped, the IO request can be sent to back to a cache of the controller to be sent at a later time. Alternatively, once the IO request is skipped it can be sent to an end of a queue of IO requests or resorted into another queue of IO requests to be sent to the drive at a later time. Alternatively, the controller can determine that a node associated with one or more drives of the storage array includes at least one first drive that is slow or has a higher number of IO requests than other drives. The controller can then move to a next node comprising one or more drives that are not busy (the process to skip one or more nodes can be based on an Adelson-Velsky and Landis (AVL) tree or AVL data structure, or other data structure, or the like).

FIG. 1 is a schematic view of computing system 100 configured to provide storage of data on one or more drives in a storage array. The computing system 100 comprises a controller 102 (e.g., a storage controller, a hard disk drive (HDD) controller, a solid-state drive (SSD) controller, a small computer system interface (SCSI) controller, a serial attached SCSI (SAS) controller, a redundant array of independent disks (RAID) controller, etc.).

In various embodiments, the controller 102 can include any suitable circuitry, logic, hardware, software, and/or code configured to allow communication (e.g., wireless communication, wired communication, and/or the like) between a host system or host device 112 and the controller 102, allow communication between the storage array 114 and the controller 102, allow communication between the storage array 114 and the host system 112, allow storage of data to one or more drives in the storage array 114, allow reading of data from one or more drives in the storage array, and/or other functionalities.

In some cases, the controller 102 includes a processor 104 and a memory 106. The processor 104 can include an integrated circuit (IC), an IC chip or multiple IC chips, a central processing unit (CPU), a microprocessor, or the like. The processor 104 can be configured to execute instructions stored in memory 106. The memory 106 may be volatile and/or non-volatile in nature. The memory 106 may include any hardware component or collection of hardware components that are capable of storing instructions and communicating those instructions to the processor 104 for execution. Non-limiting examples of memory 106 include random-access memory (RAM), static or dynamic random-access memory, read-only memory (ROM), flash memory, electrically erasable programmable read-only memory (EEPROM), Synchronous Dynamic Random Access Memory (SDRAM), double data rate (DDR) memory, optical or magnetic disk storage, flash memory, programmable read-only memories, variants thereof, combinations thereof, and the like.

In some cases, the controller 102 can include a host interface(s) 108 and a storage interface(s) 110. The host interface 108 of the controller 102 can enable the controller 102 to communicate with and/or couple to a host system 112. In some instances, the host interface 108 can be used to transmit data to or receive data from host system 112. The host system 112 can include, without limitation, one or more of a user computer, laptop, workstation, server, collection of servers, or the like. In some cases, the controller 102 can be integrated with the host system 112. Alternatively, the controller 102 can be separate from the host system 112. In some cases, the host system 112 might not be included in computing system 100.

The storage interface 110 can enable the controller 102 to communicate with and/or couple to a storage array 114 and/or one or more storage drives, devices, or disks 116a-116n in the storage array 114. In some instances, the storage interface 110 can be used to transmit or write data to or receive or read data from the storage array 114 and/or one or more storage drives 116a-116n. The storage array 114 and/or one or more storage drives 116a-116n may be co-located with one another or may be physically located in different geographical locations. The storage array 114 and/or one or more storage drives 116a-116n can include, without limitation, hard disk drives (HDDs), solid-state drives (SSDs), non-volatile memory express (NVMe)-capable SSDs, or combinations thereof, or the like.

In various cases, the controller 102 can be configured to make the multiple storage drives 116a-116n appear to a host system 112 as a single high-capacity logical storage volume (e.g., a logical drive or a logical device). Thus, the controller 102 can be configured to automatically store data supplied from the host system 112 across the multiple storage drives 116a-116n without ever exposing the manner in which the data is actually distributed to the host system 112. The controller 102 can further be configured to automatically retrieve data requested by the host system 112 from across the multiple storage drives 116a-116n without ever exposing the manner in which the data is actually provided to the host system 112.

The system 100 can utilize any type of data storage architecture or storage array 114 (e.g., RAID 1-6 or the like). The particular architecture or storage array 114 depicted and described herein should not be construed as limiting example embodiments. However, the methods and storage processes described herein are particularly relevant to RAID 5 and RAID 6 storage architectures or storage arrays 114. However, similar storage processes and/or methods could also be implemented in RAID 1-4 storage arrays as well.

In a RAID 5 storage architecture, data is divided for storage onto at least two different drives and parity information is calculated and stored on another drive. In a non-limiting example, in RAID 5 shown in FIG. 2A, data can be divided into two or more pieces or stripes 205a and 205b and stored on a first drive 116a and a second drive 116b, respectively, while parity information 205p for the first piece 205a and the second piece 205b of data is stored on a third drive 116c. Further, data can be divided into a third piece of data 210a and a fourth piece of data 210b and stored on the third drive 116c and the first drive 116a, respectively, while parity information 210p for the third piece of data 210a and the fourth piece of data 210b can be stored on the second drive 116b. RAID 6 is similar to RAID 5 where data is divided into at least two pieces of data for storage on at least two different drives (e.g., a first drive 116a and a second drive 116b). However, parity information for the at least two pieces of data is stored on at least two other drives (e.g., third drive 116c and fourth drive (not shown in FIG. 2)).

In various cases, the controller 102 can further comprise a cache 118. The controller 102 can be communicatively coupled with cache 118. While depicted as being separate from the controller 102, it should be appreciated that the cache 118 may be integral to the controller 102, meaning that components of the controller 102 and the cache 118 can be contained within a single physical housing or computing unit (e.g., server blade). In some cases, the cache 118 can be included within memory 106. In some embodiments, the cache 118 may be integrated within the controller 102 and may be executed on a CPU chip or placed on a separate chip within the controller 102. In other embodiments, the cache 118 may be external to the controller 102.

The cache 118 can be provided to temporarily store IO operations received from the host system 112 and/or data received from host system 112 before the IO operations are executed or data is transmitted to the one or more storage drives 116a-116n, or the like for storage. In various cases, the controller 102 or the host 112 may be configured to temporarily store data in the cache 118 during execution of or in association with IO operations (e.g., IO requests, IO commands, or IO operations, or the like received from the host system 112) received by the controller 102 from the host system 112.

Depending upon the nature of the IO operations or data and the amount of information being processed during the IO operation, the controller 102 may require a large number of memory modules 120 or a smaller number of memory modules 120. The memory modules 120 can include, without limitation, flash memory, RAM, DDR memory, or some other type of computer memory that is quickly accessible and can be rewritten multiple times. The number of separate memory modules 120 in the cache 118 is typically larger than one, although the cache 118 may be configured to operate with a single memory module 120 if desired. In various cases, the controller 102 can be configured to access the memory modules 120, temporarily store IO operations on the memory modules 120, temporarily store data on the memory modules 120 in association with a corresponding IO operation, and/or retrieve data stored on the memory modules 120 in connection with performing a corresponding IO operation or some other executable command or request.

In operation, when the host 112 writes data to the storage array 114, the host 112 issues an IO operation (e.g., a write IO operation or the like) to the controller 102 that manages the storage array 114. In a non-limiting example, write IO operations or data associated with write IO operations received from the host system 112 or applications (e.g., computer software packages performing specific functions or the like) running on the host system 112 are typically not written immediately to storage drives 116a-116n of the storage array 114. Instead, the write IO operations or data associated with write IO operations are temporarily stored in the cache 118 for a period time. This period of time can be a random period of time (e.g., until the cache 118 becomes full or about full or capacity of the cache 118 reaches a predetermined threshold, or the like) or a predetermined amount of time (e.g., 1 second, 1 minute, 5 minutes, or the like). Once the controller 102 determines that the cache 118 is full or about full, the capacity of the cache 118 has reached a predetermined threshold, the predetermined amount of time has passed, or that it is time to execute the write IO operations or store data associated with write IO operations, the write IO operations stored in cache 118 can be accessed by the controller 102 and sometimes reorganized. The one or more write IO operations can then be sent or flushed by the controller 102 to the one or more drives 116a-116n of the storage array 114 for execution. The data associated with the one or more write IO operations can then be stored on the one or more drives 116a-116n executing the one or more write IO operations sent by the controller 102.

This process is called a "delayed write" or a "write back cache." The advantage of a writeback cache is lower latency as seen by the host system 112 and better performance of the storage array 114. These advantages occur because the controller 102 can flush IO operations for drives in a sequential manner (e.g., for HDDs or the like) or wait for many IO operations to accumulate in cache 118 and then flush the IO operations to the drives 116a-116n (e.g., for SDDs or the like). In various cases, for SSDs, these IO operations can be flushed to the drives 116a-116n using a first-in, first-out method (e.g., IO operations received first are flushed to the one or more drives first), using a LRU method described below, or in any other sequence or order as determined by the controller 102. In either case for HDDs and SSDs, the writes to the drives 116a-116n are "delayed" and can occur in a sequence that is different from the sequence of IO operations received from the host system 112.

In some embodiments, the IO operations from the host system 112 can be added by the controller 102 from the cache 118 to a master queue 300a of IO operations that are to be flushed to the storage array 114, as shown in FIG. 3. In various cases, the master queue 300a can be generated, sorted, or resorted by the controller 102 when the controller 102 determines that the cache 118 is full or about full, the capacity of the cache 118 has reached a predetermined threshold, the predetermined amount of time has passed, or that it is time to execute or flush the write IO operations or store data associated with write IO operations from the cache 118 to the storage array 114. In some cases, the master queue 300a of IO operations contains IO operations for all drives (e.g., drives 116a-116n) of storage array 114. In this way, the controller 102 can determine which IO operations still need to be flushed or sent to the storage array 114 for execution.

The master queue 300a of IO operations can be generated, sorted, or resorted in various ways. In some cases, the IO operations in the master queue 300a can be generated, sorted, or resorted based on data that has least recently been used (LRU). LRU operates on the principle that the data most recently accessed by a host system 112, an application of the host system 112, or a user of a host system 112 is likely to be accessed again in the near future. Thus, IO operations for the least recently accessed data are sent by the controller 102 to the storage array 114 first while IO operations associated with more recently used data remains available in the cache 118. LRU is particularly relevant for use by SSDs. In other cases, particularly for SSDs, the master queue 300a can be sorted based on IO operations received first using a first-in, first-out method. In other words, IO operations that are first received can be sent to the storage array 114 first while IO operations that are received last are sent to the storage array 114 last. Alternatively, in other cases, particularly for SSDs, the master queue 300a can be sorted randomly or in another sequence or order by the controller 102. In yet other cases, the IO operations in the master queue 300a or cache 118 can be generated, sorted, or resorted based on one or more addresses (e.g., Logical Block Addresses (LBAs) or the like) associated with the data. In a non-limiting example, the IO operations in the master queue can be generated, sorted, or resorted based on an LBA or other address associated with each IO operation. This sorting process is particularly relevant to HDDs. Alternatively, in other cases, particularly for HDDs, the master queue can be sorted in another sequence or order by the controller 102.

In various cases, for any sorting method, the master queue 300a can be generated, sorted, or resorted after a predetermined amount of time (e.g., 0.01 seconds, 0.05 seconds, 0.1 seconds, 0.5 seconds, 1 second, or the like), each time a new IO operation is received from the host system 112, each time the controller 102 determines it is time to flush the cache 118 (e.g., when the controller 102 determines that the cache 118 is full or about full, the capacity of the cache 118 has reached a predetermined threshold, the predetermined amount of time has passed, or that it is time to execute or flush the write IO operations or store data associated with write IO operations), or the like to ensure that the IO operations are sorted based on the LRU data or address associated with each IO operation or request. Although various sorting methods are described above with respect to the master queue 300a, other sorting methods may be used to generate, sort, or resort the IO operations in the master queue 300a.

Figure 3B:
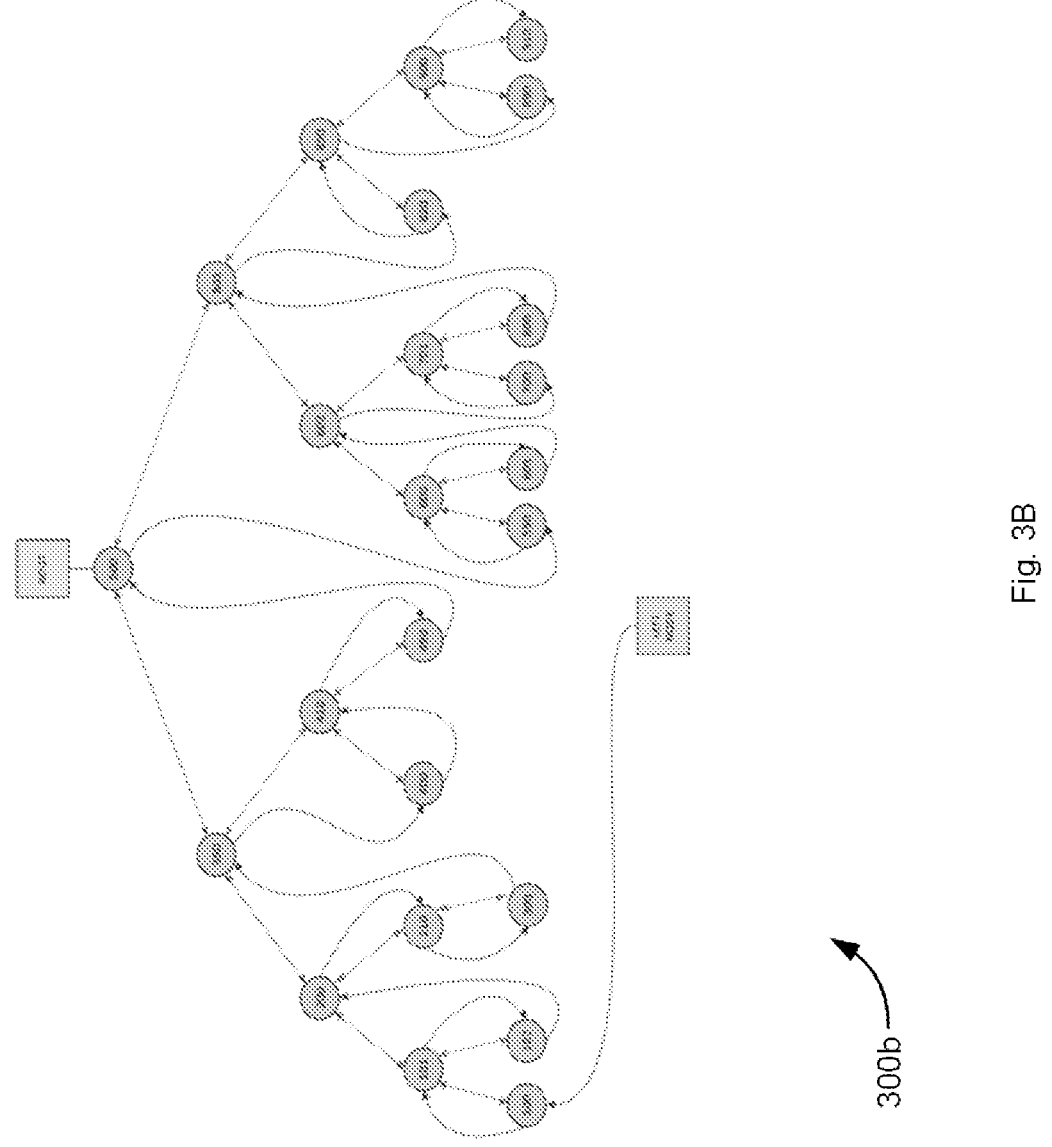
FIG. 3B is a diagram illustrating an exemplary AVL tree for a storage array, in accordance with various embodiments.

In some cases, as shown in FIG. 3B, an AVL tree 300b or other data structure can be used to determine one or more drives configured to receive an IO operation. The AVL tree can include one or more nodes (e.g., node 100) associated with one or more drives 116a-116n of the storage array 114. Each node can contain information to determine whether an IO operation is to be sent to a drive associated with the node or to generate a flush request to flush one or more IO operations from the cache to one or more drives associated with the node. The AVL tree 300b is particularly useful for HDDs.

In various cases, the controller 102 can further be configured to maintain a pending individual IO request list (e.g., IO request lists 402a-402c of FIG. 4 or the like) for each individual drive 116a-116n of the storage array 114. In various cases, the master queue 300a of IO operations and the one or more pending individual IO request lists can be stored in memory 106 or cache 118 of controller 102 or a different memory separate from memory 106, cache 118, or controller 102.

In various cases, the pending individual IO request list can be generated by including one or more host IO operations for specific drives 116a-116n of the storage array 114 or by translating the one or more host IO operations received from the host system 112 into one or more IO requests for specific drives 116a-116n of the storage array 114. In some cases, the one or more IO requests can include the one or more IO operations received from the host system 112 or be associated with the one or more IO operations received from the host system 112. In some cases, master queue 300a can include the one or more IO requests translated from the IO operations instead of the IO operations themselves. The IO requests can be sorted in a similar manner as described above with respect to the IO operations.

In some instances, the IO operation received from the host system 112 can be addressed to or include one or more addresses (e.g., LBAs or the like) of the storage array 114. The controller 102 can receive the host IO operation, review the one or more addresses indicated by the host IO operation, and translate the host IO operation into one or more IO requests (e.g., IO requests, IO operations, IO commands, or the like generated by the controller 102 from the IO operation) directed to the storage drives of the storage array 114 that store pieces of data based on the addresses provided by the host system 112. In various cases, the host IO operation provided by the host system 112 can indicate a general address to perform a function (e.g., write data, read data, or the like) and the controller 102 can translate the general address into an IO request addressed to a specific location on a particular drive of the storage array 114 to perform the function.

In a non-limiting example, when the controller 102 receives an IO operation to write data to the storage array 114 from the host system 112, the controller 102 or host system 112 can translate the host IO operation into one or more IO requests for one or more specific drives of the storage array 114. The controller 102 can then send those IO requests to the one or more drives 116a-116n for execution to read, store, or write the data to a particular location of the specific drives.

In various cases, the pending individual IO lists 402a-402c can include one or more IO requests that have been translated or generated from the host IO operation, that are associated with the host IO operation, or that are included in the host IO operation. In some cases, the pending individual IO lists 402a-402c can include the one or more host IO operations that are specifically directed to a particular drive as determined by the controller 102. In various cases, the individual IO lists 402a-402c can include one or more pieces or parts of the host IO operation that are specifically directed to a particular drive as determined by the controller 102. In a non-limiting example, the controller 102 can determine that host IO operation 01 of FIG. 3 is directed to specific locations on first drive 116a and third drive 116c and translate the host IO operation 01 to IO request 01A directed to first drive 116a and IO request 01B directed to third drive 116c. The IO request 01A can then be added to pending individual IO request list 402a for the first drive 116a and the IO request 02B can be added to the pending individual IO list 402c for the third drive 116c.

In some cases, IO operations from the host can be translated into two or more IO requests by the controller 102. In a non-limiting example, some IO operations to write, modify, or update data to the storage array 114 can be translated into Read-Modify-Write (RMW) requests by the controller 102. During a RMW request, the controller 102 can translate the IO operation into a series of read and write IO requests to retrieve, update, or add data or pieces of data and/or parity information to the storage array 114 for the indicated addresses.

Figure 2B:
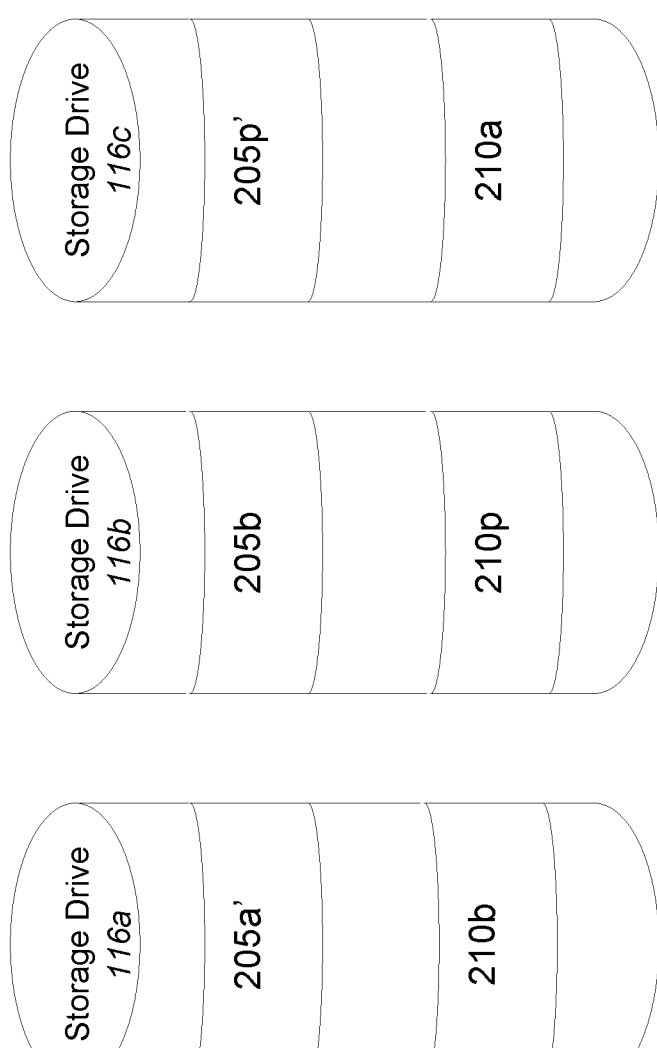

For example, if a host IO operation (e.g., IO operation 01 of master queue 300a) indicates that a first piece 205a of data needs to be updated with an updated or new piece 205a' of data at a first address associated with the first piece 205a of data at the first drive 116a, then the controller 102 can translate this IO host operation into four different IO requests that need to be executed by the first drive 116a and the third drive 116c of FIG. 2A. The IO operation can be translated by the controller 102 into a first IO request (e.g., IO Request 01A of pending individual IO request list 402a) to read the first piece 205a of data from the first drive and a second IO request (e.g., IO Request 01B of pending IO request list 402b) to read the parity information 205p from the third drive 116c. Once the first piece 205a of data and the parity information 205p is read, then the controller 102 can modify or update (e.g., by subtracting out the first data 205a and adding in the updated piece 205a' of data or the like) the parity information 205p into updated parity information 205p'. Once the updated parity information 205p' is calculated, the controller 102 can then send a third request to write the updated piece 205a' of data to the first drive 116a and a fourth request to write the updated parity information 205p' to the third drive 116c. The updated data 205a' and parity information 205p' is shown in FIG. 2B. Thus, two read requests and two write requests can be generated by the controller 102 based on an IO operation to update or write over a first piece 205a of first data located at a particular address.

In order to maintain the pending individual IO request list (e.g., pending individual IO request lists 402a-402c) for each individual drive in the storage array 114, the controller 102 can be configured to update each pending individual IO request list each time an IO request is sent to a drive or completed by a drive. In other words, when an IO request is first sent to a drive (e.g., first drive 116a) by the controller 102, the controller 102 can add the IO request to a corresponding pending individual IO request list (e.g., first pending individual IO request list 402a) for the drive. When the IO request is completed by the drive, the drive can be configured to send an indication to the controller 102 that the IO request has been completed and the controller 102 can remove or mark the IO request as completed or no longer pending on the pending individual IO request list. By maintaining pending individual IO request lists for each individual drive in the storage array 114, the controller 102 can monitor the pending individual IO request lists to determine or detect a number (e.g., a total number or the like) of IO requests pending for each drive.

In various cases, the controller 102 and/or host 112 will typically try to balance or evenly distribute IO requests that are sent to each drive 116a-116n. In this manner, each drive 116a-116n would be almost equally loaded with IO requests which means that the storage array 114 is performing efficiently. However, even distribution of IO requests does not always occur and often one or more drives of a storage array 114 have more IO requests pending than other drives of the storage array 114 as shown in FIG. 4 (where first drive 116a has more pending IO requests in first pending individual IO request list 402a than storage drives 116b-116d). This situation can occur when one or more drives are receiving a few more IO requests than other drives of the storage array 114 or when one or more drives of the storage array 114 become temporarily slower (e.g., take a longer time to process an IO request, experience a fault, need to restart, or the like) than other drives of the storage array 114.

If the IO requests are unevenly distributed among the drives 116a-116n of the storage array 114, this can lead to a cascade or self-feeding loop that degrades the performance of the storage array 114. In a non-limiting example, the first drive 116a can have 15 pending IO requests while the third drive can have 4 pending IO requests (as shown in FIG. 3). When the controller 102 receives an IO operation indicating that a first piece 205a of data needs to be updated with an updated or new piece 205a' of data as described above, then the controller 102 can translate this IO host operation into four different IO requests that need to be executed by the first drive 116a and the third drive 116c of FIG. 2. In this scenario, the controller 102 will send the first IO request to the first drive to read the first piece 205a of data and the second IO request to the third drive to read the parity information 205p. However, the second IO request will be completed before the first IO request because the third drive 116c has less IO requests pending. Once the second request is completed, the third drive 116c cannot start or finish executing the third IO request until the first IO request is completed. This tends to slow down the storage array 114 because the third drive 116*c* cannot proceed to update the parity information 205*p* until the first IO request is completed at the first drive 116*a*.

In order to address the issues described above, further operation of the controller 102 and the one or more drives 116*a*-116*n* is described below with respect to FIG. 5.

Figure 5:
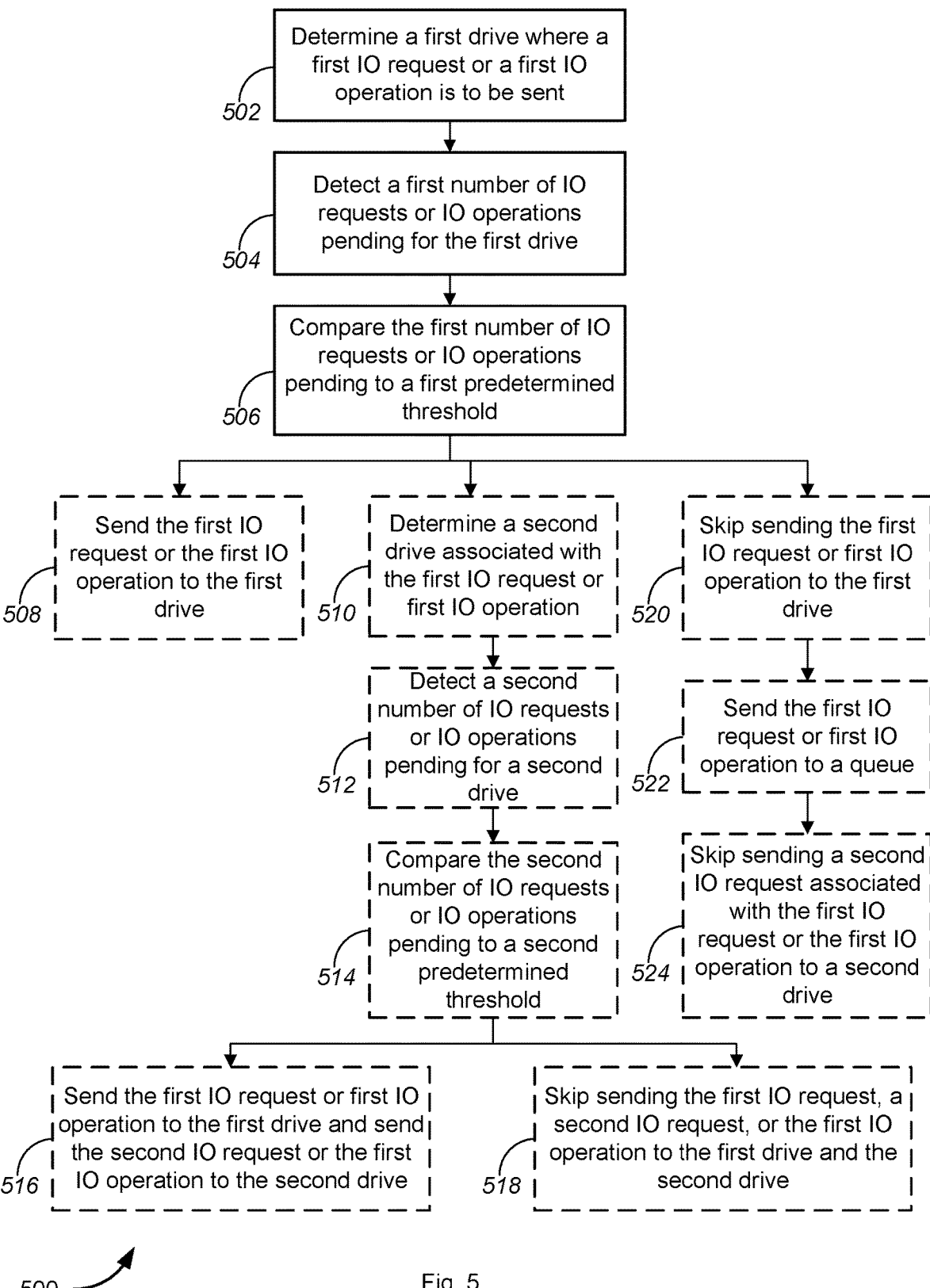
FIG. 5 is a flow diagram of a method to dynamically distribute IO requests, in accordance with various embodiments.

FIG. 5 is a flow diagram 500 illustrating a process or method to implement distribution of IO requests or IO operations to one or more drives (e.g., one or more drives 116*a*-116*n*) of a storage array 114, in accordance with various embodiments. FIG. 5 merely provides an example, which should not unduly limit the scope of the claims. In some embodiments, the system 100 shown in FIG. 1 is capable of performing method 500. However, the method is not limited to only being performed with system 100 of FIG. 1 and can be performed by other systems and/or storage architectures. In some cases, a host system, controller, processor, or circuit of system 100 is configured to execute the method 500. In some cases, different host systems, controllers, processors, or circuits are configured to execute one or more blocks or steps of the method 400. Alternatively, a single host system, controller, processor, or circuit is configured to execute the blocks or steps of the method 500.

Method 500 can begin at block 502 by determining a first drive where a first IO request or a first IO operation is to be sent. In various cases, the first IO request can be generated or translated from, associated with, or included in a first IO operation sent by a first device (e.g., a host device) to a controller. In other cases, the first IO request can include the first IO operation directed to a specific drive of the storage array or a part of the first IO operation directed to a specific drive of the storage array. In some embodiments, the first IO request or first IO operation can be associated with a request to read data from the first drive, a request to write data to the first drive, or any other request configured to cause the first drive to perform a function, or the like. In a non-limiting example, the first IO request or first IO operation can be associated with a request to write or update first data on the first drive. The first IO operation or first data can be sent from a host device or host system to a controller of a storage array for storage. The IO operation, IO request, or first data can be temporarily stored in a cache of the controller until the controller is ready to send the first IO request or the first IO operation to store the first data to the first drive of the storage array for execution.

In various cases, multiple IO operations including the first IO operation or the first IO request can be retrieved by the controller from the cache to be flushed or sent to the storage array for execution after a period of time as described above. The multiple IO operations can be sorted by the controller 102 into a master queue (e.g., master queue 300*a* or the like) for execution by the storage array. In other cases, one or more IO operations including the first IO operation or the first IO request can be retrieved by a node (e.g., a node of an AVL tree 300*b* or the like) from the cache to be flushed or sent to one or more drives including the first drive associated with the node as described above. Each IO operation of the queue can then be used to generate or be translated by the controller 102 into one or more IO requests or IO operations for execution by the one or more drives of the node.

In various cases, the controller can be configured to determine where to send the first IO request, IO operation, or store the first data based on an address associated with the first IO request, the first IO operation, or the first data. In order to determine the address associated with the first IO request, the first IO operation, or the first data, the host can send the first IO operation to the controller for execution. The first IO operation can include one or more addresses associated with the storage array indicating a general location in the storage array for the controller to read data from, write data to, or perform another function, or the like. The first data can be sent to the controller from the host as part of the first IO operation. The controller can receive the first IO operation, review the address indicated by the first IO operation, and translate the first IO operation into one or more IO requests directed to particular drives of the storage array based on the addresses associated with the first IO operation. In various cases, as indicated above, the address provided by the host can indicate a general location while the controller can translate the general location provided by the host into one or more IO requests to be sent to specific locations on particular drives in the storage array.

Next, the method 500 can continue at block 504 and detect a first number or a total number of IO requests or IO operations pending for the first drive. In order to detect a first number of IO requests or IO operations pending for the first drive, the controller can maintain or monitor an individual pending IO request list for each individual drive in the storage array. In a non-limiting example, in FIG. 4, an individual pending IO request list 402*a*-402*c* is shown for each drive 116*a*-*c* for a portion of storage array 114.

In some embodiments, the method 500 can include, at block 506, comparing the first number of IO requests or IO operations pending for the first drive to a first predetermined threshold or a first threshold criteria. In some cases, comparing the first number of IO requests or IO operations pending for the first drive to the first predetermined threshold or the first threshold criteria, includes determining whether the first number of IO requests or IO operations pending for the first drive exceeds or is greater than the first predetermined threshold or the first threshold criteria. In various cases, the predetermined threshold or threshold criteria can be determined by comparing the first number of pending IO requests or IO operations of the first drive to (1) one or more other numbers of pending IO requests or IO operations associated with one or more other drives of the storage array; or (2) an average or median number of pending IO requests or IO operations associated with two or more drives (e.g., two or more other drives of the storage array not including the first drive or two or more drives of the storage array including the first drive) of the storage array; or the like.

Based on the comparison of the first number of IO requests or IO operations pending for the first drive to the first predetermined threshold, the method 500, at optional block 508, can send the first IO request or first IO operation to the first drive for execution by the first drive or, at optional block 510, can determine a second drive associated with the first IO request or the first IO operation, or, at optional block 520, can skip sending the first IO request to the first drive.

In various cases, at optional block 508, based on a determination that the first number of IO requests or IO operations pending for the first drive is less than the first predetermined threshold or threshold criteria, the controller can send the first IO request to the first drive.

Alternatively, at optional block 510, based on a determination that the first number of IO requests or IO operations pending for the first drive is less than the first predetermined threshold or threshold criteria, the controller can determine one or more second drives associated with the first IO request or the first IO operation. In various cases, as discussed above, IO operations received from a first device or a host can include or be associated with multiple drives of a storage array. In other words, the first IO operation can be associated with multiple IO requests including the first IO request for the first drive and a second IO request for a second drive. The first IO request or first IO operation can thus be associated with the second IO request or the second drive.

The method 500 can then continue, at optional block 512, by detecting a second number or a total number of IO requests or IO operations pending for the one or more second drives and, at optional block 514, by comparing the second number of IO requests or IO operations pending for the one or more second drives to a second predetermined threshold or a second threshold criteria. These steps can be performed in a similar manner as discussed above with respect to the first drive at blocks 504 and 506.

Based on the comparison of the second number of IO requests or IO operations pending for the one or more second drives to the second predetermined threshold, the method 500, at optional block 516, can send the first IO request or first IO operation to the first drive for execution by the first drive and/or can send the second IO request or first IO operation to the second drive for execution by the second drive or, at optional block 518, can skip sending the first IO request to the first drive, the second IO request to the second drive, and/or the first IO operation to the first and second drives.

In various cases, at optional block 516, based on a determination that the first number of IO requests or IO operations pending for the first drive is less than the first predetermined threshold or threshold criteria and based on a determination that the second number of IO requests or IO operations pending for the one or more second drives is less than the second predetermined threshold or threshold criteria, the controller can send the first IO request or first IO operation to the first drive and send the second IO request or first IO operation to the one or more second drives.

Alternatively, at optional block 518, based on a determination that the first number of IO requests or IO operations pending for the first drive is less than the first predetermined threshold or threshold criteria and based on a determination that the second number of IO requests or IO operations pending for the one or more second drives is greater than the second predetermined threshold or threshold criteria, the controller can skip sending the first IO request or first IO operation to the first drive and skip sending the second IO request or first IO operation to the one or more second drives. In other words, the entire first IO operation (which can include the first IO request and the one or more second IO requests) is skipped and can stay in a cache of the controller or can be sent back to a cache of the controller or a master queue. The process to skip the first IO request, second IO request, or first IO operation is discussed further below with respect to blocks 520-524.

Alternatively, based on a determination that the first number of IO requests or IO operations pending for the first drive exceeds the first predetermined threshold or threshold criteria, the controller, at optional block 520, can skip sending the first IO request, first IO operation, or data to the first drive. In a non-limiting example, if the first number of pending IO requests or IO operations of the first drive is higher than or greater than (e.g., 1.1 times higher, 1.5 times higher, 2 times higher, or the like) (1) a number of pending IO request for at least one other drive of the storage array or (2) an average or median number of pending IO requests for two or more drives of the storage array; or the like, then the controller can skip sending the first IO request, first IO operation, or data to the first drive. Once the first drive is skipped, then all other drives where the first IO operation is configured to be sent to can also be skipped. In other words, none of the other drives receive the first IO operation. Alternatively, once the first IO request is skipped, then all other IO requests associated with the first IO request can be skipped. In other words, the controller can be configured to skip sending other IO requests associated with the first IO request to one or more other drives.

Once skipped, the first IO request or first IO operation can then stay in a cache of the controller or be sent back to a cache of the controller and/or a master queue (e.g., master queue 300a) of IO operations or IO requests for the storage array at optional block 522. The master queue can be used by the controller to determine an order to send the IO operations or IO requests to the storage array for execution. In other words, the controller can send or transmit the IO requests or IO operations to one or more drives of the storage array in the order provided by the master queue. The master queue can contain all IO requests or IO operations that are to be transmitted to the storage array by the controller. In various cases, the first IO request or IO operation can be sent to an end of the master queue. In other words, the first IO request or IO operation can be added back to the master queue as a last IO request or IO operation to be executed at least until one or more additional IO requests or IO operations are added to the master queue. Alternatively, in other cases, the first IO request or IO operation can be added back to the master queue and then the master queue can be resorted based on one or more addresses associated with the first IO request or IO operation and other IO requests or IO operations contained in the master queue. In this scenario, the first IO request or IO operation is not necessarily added to the end of the master queue, but could be located anywhere within the master queue.

Alternatively, once the first IO request or first IO operation is skipped, then a first node (e.g., node 100 of an AVL tree 300b) associated with the first IO request or first IO operation can also be skipped and the controller can move onto a next node (e.g., node 101 of the AVL tree 300b) and determine one or more other IO requests or IO operations for the next node. In a non-limiting example, the controller can traverse the AVL tree and arrive at a first node (e.g., node 100 of the AVL tree 300b). The controller can then determine one or more IO requests or IO operations associated with one or more drives of the first node stored in the cache. Based on a determination that a first IO request of the one or more IO requests or a first IO operation of the one or more IO operations is to be sent to the first drive, the controller can skip this node and move on to a next node (e.g., node 101 of the AVL tree 300b) and process one or more IO requests or IO operations associated with the second node.

Additionally, in a non-limiting example, once the first IO request or IO operation is skipped, the IO request or IO operation or first data associated with the first IO request or IO operation can be stored or continue to be stored in a cache of the controller until the controller determines the first drive is ready to execute the first IO request or IO operation, until the master queue is resorted, or until a new master queue is generated by the controller using the IO requests or IO operations stored in the cache. In various cases, by storing or continuing to store the IO request, IO operation, or the first data in the cache of the controller, the first IO request or IO operation can be resorted into a new master queue when the controller determines that the one or more IO requests or IO operations stored in the cache should be flushed from the cache.

In some cases, at optional block 524, the method 500 can further be configured to skip one or more second IO requests associated with or related to the first IO request to one or more second drives or skip sending the first IO request to the one or more second drives based on the comparison of the first number of IO requests pending for the first drive to the first predetermined threshold or based on the determination the first number of IO requests pending for the first drive exceeds the first predetermined threshold.

In a non-limiting example, this scenario can occur when the first IO operation is translated by the controller into or includes two or more IO requests (e.g., one or more RMW requests). For example, a RMW request, for a RAID 5 storage array, requires four IO requests (e.g., a first read IO request for a first drive, a second read IO request for a second drive, a third write IO request for the first drive, and a fourth write IO request for the second drive). However, if the first number of IO requests or IO operations pending for the first drive exceeds the first predetermined threshold, then the first read IO request will be skipped and not sent to the first drive. By skipping the first read IO request, the controller can also skip sending the second read IO request for the second drive. If the second read IO request for the second drive is sent to the second drive and not skipped, the RMW request will not be able to be completed until the first read IO request is sent to the first drive causing the second drive to be busy (e.g., unable to execute any other IO requests) until the first request is completed at the first drive. Thus, both the first read IO request and the second read IO request or the first IO operation comprising the first read IO request and the second read IO request need to be skipped (if the first read IO request is skipped) to prevent degradation of the performance of the storage array. Both the first read IO request and the second read IO request or the first IO operation comprising the first read IO request and the second read IO request can then be sent to the master queue or cache of the controller for execution by the first and second drive at a later time.

In another non-limiting example, a RMW request, for a RAID 6 storage array, requires six IO requests (e.g., a first read IO request for a first drive, a second read IO request for a second drive, a third read IO request for a third drive, a first write IO request for the first drive, a second write IO for the second drive, and a third write IO request for a third drive). However, if the first number of IO requests or IO operations pending for the first drive exceeds the first predetermined threshold, then the first read IO request will be skipped and not sent to the first drive. By skipping the first read IO request, the controller can also skip sending the second read IO request for the second drive and the third read IO request for the third drive. If the second read IO request and the third read IO request are sent and not skipped, the RMW request will not be able to be completed until the first read IO request is sent to the first drive causing the second drive and the third drive to be busy until the first request is completed at the first drive. Thus, both the first read IO request, the second read IO request, and the third IO request or the first IO operation comprising the first read IO request, the second read IO request, and the third read IO request need to be skipped (if the first read IO request is skipped) to prevent degradation of the performance of the storage array.

However, although the second read IO request or first IO operation can be skipped for the second drive, as described above. This does not mean that a third or next IO request (not associated with or unrelated to the first IO request) or a second or next IO operation (not associated with or unrelated to the first IO operation) addressed to the second drive or another drive of the storage array needs to be skipped. Instead, the controller can follow a similar process as described above with respect to the first drive to process the third IO request or second IO operation and determine whether the third IO request or second IO operation should be sent or not sent to the second drive or another drive. For example, based on a determination that a second number of IO requests or IO operations pending for the second drive or another drive does not exceed a second predetermined threshold, the third IO request or second IO operation can be sent to the second drive or another drive for execution. Alternatively, based on a determination that a second number of IO requests or IO operations pending for the second drive or another drive does exceed a second predetermined threshold, the third IO request or second IO operation can be skipped and be sent to the master queue or the cache for execution by the second drive or another drive at a later time.

The techniques and processes described above with respect to various embodiments may be used to dynamic modification or distribution of IO requests in a storage array, as described herein. As discussed above, by dynamically distributing IO requests among drives and skipping sending IOs to drives that are busy, IO requests can be more evenly distributed among the drives of a storage array and degradation of the storage array can be prevented.

While some features and aspects have been described with respect to the embodiments, one skilled in the art will recognize that numerous modifications are possible. For example, the methods and processes described herein may be implemented using hardware components, custom integrated circuits (ICs), programmable logic, and/or any combination thereof. Further, while various methods and processes described herein may be described with respect to particular structural and/or functional components for ease of description, methods provided by various embodiments are not limited to any particular structural and/or functional architecture but instead can be implemented in any suitable hardware configuration. Similarly, while some functionality is ascribed to one or more system components, unless the context dictates otherwise, this functionality can be distributed among various other system components in accordance with the several embodiments.

Referring generally again to FIG. 5, for the purposes of the present disclosure, the term "controller," "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). Furthermore, the memory may include any storage medium known in the art suitable for storing program instructions executable by the associated processor. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor. In embodiments, the memory medium may be located remotely with respect to the physical location of the processor.

In the present disclosure, the methods, operations, and/or functionality disclosed may be implemented as a step switching hardware system and/or as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

What is claimed is:

1. A controller for a redundant array of independent disks (RAID) comprising:
  a processor; and
  a memory comprising instructions, when executed by the processor, cause the processor to:
    determine a first drive configured to receive a first input/output (IO) request;
      detect a first number IO requests pending for the first drive;
      determine the first number of IO requests pending for the first drive exceeds a first predetermined threshold;
    based on a determination the first number of IO requests pending for the first drive exceeds the first predetermined threshold, skip sending the first IO request to the first drive;
    after skipping the first IO request, process a next IO request;
      translate a first IO operation received from a first device into one or more IO requests for one or more drives including the first IO request for the first drive and a second IO request for a second drive; and
    based on a determination the first IO request was skipped, cause the processor to skip sending the second IO request to the second drive.

2. The controller of claim 1, wherein the instructions, when executed by the processor, further cause the processor to translate a first IO operation received from a first device into one or more IO requests including the first IO request, wherein the first IO operation includes an address to send the IO operation, wherein translating the first IO operation received from the first device into the one or more IO requests including the first IO request comprises translating the address of the IO operation to one or more locations associated with one or more drives of a storage array, wherein the one or more locations include a first location on the first drive, and wherein determining the first drive configured to receive the first IO request comprises determining the first drive comprising the first location.

3. The controller of claim 1, wherein detecting the first number of IO requests pending for the first drive comprises monitoring an IO request list associated with the first drive.

4. The controller of claim 1, wherein determining the first number of IO requests pending for the first drive exceeds the first predetermined threshold comprises determining the first number of IO requests pending for the first drive of a storage array exceeds at least one of an average number or a median number of second IO requests pending for two or more second drives of the storage array.

5. The controller of claim 1, wherein the first IO request is associated with a first IO operation received from a first device, wherein the instructions, when executed by the processor, further cause the processor to sort a plurality of IO operations received from the first device including the first IO operation into a queue indicating an order to send the one or more IO operations to a storage array comprising the first drive.

6. The controller of claim 5, wherein the plurality of IO operations in the queue are sorted based on at least one of least recently used (LRU) data associated with a corresponding IO operation or an address associated with the corresponding IO operation.

7. The controller of claim 5, wherein skipping sending the first IO request to the first drive comprises sending the first IO operation to an end of the queue.

8. The controller of claim 5, wherein skipping sending the first IO request to the first drive comprises sending the first IO operation to the queue and resorting the plurality of IO operations in the queue based on an address associated with a corresponding IO operation.

9. The controller of claim 1, wherein skipping sending the first IO request to the first drive comprises skipping a first node associated with the first drive.

10. The controller of claim 1, wherein the instructions, when executed by the processor, further cause the processor to:
  determine a second drive where a second IO request associated with the first IO request is to be sent; and
  based on a determination the first number of IO requests pending for the first drive exceeds the first predetermined threshold, skip sending the second IO request to the second drive.

11. The controller of claim 10, wherein the first IO request comprises at least one of a first request to read first data stored on the first drive or a second request to update the first data on the first drive and the second IO request comprises a third request to read parity information stored on the second drive or a fourth request to update the parity information on the second drive.

12. The controller of claim 10, wherein the instructions, when executed by the processor, further cause the processor to:
  determine the second drive where a third IO request is to be sent;
  detect a second number of IO requests pending for the second drive;
  determine the second number of IO requests pending for the second drive does not exceed a second predetermined threshold; and
  based on a determination the second number of IO requests pending for the second drive does not exceed the second predetermined threshold, send the third IO request to the second drive.

13. A method for operating a controller of a redundant array of independent disks (RAID) comprising:
  determining a first drive where a first input/output (IO) operation is to be sent;
  detecting a first number of IO operations pending for the first drive;
  comparing the first number of IO operations pending for the first drive to a predetermined threshold;
  based on a comparison of the first number of IO operations pending for the first drive to the predetermined threshold, skipping sending the first IO operation to the first drive; and
  after skipping the first IO operation, process a next IO operation;
  translating a first IO operation received from a first device into one or more IO requests for one or more drives including the first IO request for the first drive and a second IO request for a second drive; and based on a determination the first IO request was skipped, cause the processor to skip sending the second IO request to the second drive.

14. The method of claim 13, wherein skipping sending the first IO operation to the first drive comprises skipping a first node associated with the first drive.

15. The method of claim 13, further comprising adding a plurality of IO operations for a storage array comprising the first drive to a queue indicating an order to execute the plurality of IO operations.

16. The method of claim 15, wherein skipping sending the first IO operation comprises at least one of adding the first IO operation to an end of the queue or sending the first IO operation to the queue and resorting the queue based on an address associated with a corresponding IO operation.

17. The method of claim 13, further comprising:

determining two or more drives including the first drive where the IO operation is to be sent; and based on a comparison of the first number of IO operations pending for the first drive to the predetermined threshold, skipping sending the IO operation to the two or more drives including the first drive.

18. A storage system comprising:

a cache configured to store data including first data and second data;

a storage array comprising a first drive; and a controller configured to read or write at least a portion of the data from or to the storage array, the controller further configured to:

detect the first data stored in the cache;

determine the first drive where the first data is to be stored;

detect a number of input/output (IO) requests pending for the first drive;

compare the number of IO requests pending for the first drive to a threshold criteria;

based on a comparison of the number of IO requests to the threshold criteria, skip storing the first data on the first drive;

after skipping storing the first data, process the second data;

translate a first IO operation received from a first device into one or more IO requests including the first IO request, wherein the first IO operation includes an address to send the IO operation; and translate the address of the IO operation to one or more locations associated with one or more drives of a storage array.

19. The storage system of claim 18, wherein comparing the number of IO requests pending for the first drive to the threshold criteria comprises determining the number of IO requests pending for the first drive of a storage array exceeds at least one of an average number or a median number of second IO requests pending for two or more second drives of the storage array.

\* \* \* \* \*